United States Patent
Ashley et al.

(10) Patent No.: US 9,892,247 B2
(45) Date of Patent: Feb. 13, 2018

(54) MULTIMODAL BIOMETRIC AUTHENTICATION SYSTEM AND METHOD WITH PHOTOPLETHYSMOGRAPHY (PPG) BULK ABSORPTION BIOMETRIC

(71) Applicant: Motorola Mobility LLC, Chicago, IL (US)

(72) Inventors: James Ashley, Napersville, IL (US); Paul Christian, Crystal Lake, IL (US); Julius Gyorfi, Vernon Hills, IL (US)

(73) Assignee: Motorola Mobility LLC, Chicago, IL (US)

( * ) Notice: Subject to any disclaimer, the term of this patent is extended or adjusted under 35 U.S.C. 154(b) by 83 days.

(21) Appl. No.: 14/985,291

(22) Filed: Dec. 30, 2015

(65) Prior Publication Data

US 2017/0193207 A1    Jul. 6, 2017

(51) Int. Cl.
G06F 21/00 (2013.01)
G06F 21/32 (2013.01)
H04W 12/06 (2009.01)

(52) U.S. Cl.
CPC ............ G06F 21/32 (2013.01); H04W 12/06 (2013.01)

(58) Field of Classification Search
CPC .......... G06F 21/32; G06F 21/35; G06F 1/163; H04W 12/06
USPC ............................................................ 726/7
See application file for complete search history.

(56) References Cited

U.S. PATENT DOCUMENTS

| | | | |
|---|---|---|---|
| 2003/0036685 A1* | 2/2003 | Goodman | A61B 5/0002 600/300 |
| 2004/0104266 A1* | 6/2004 | Bolle | G06F 21/6245 235/382 |
| 2014/0107493 A1* | 4/2014 | Yuen | H04W 4/027 600/473 |
| 2014/0114151 A1 | 4/2014 | Miller | |
| 2015/0112606 A1* | 4/2015 | He | G06F 21/00 702/19 |
| 2016/0012656 A1* | 1/2016 | Chuang | G07C 9/00071 340/5.52 |

(Continued)

OTHER PUBLICATIONS

Singh, M., et al., PPG Profile Investigations for Different Fingers in a Subject, International Journal of Computer Science and Communication, Jul.-Dec. 2011, pp. 377-379, vol. 2, No. 2, Thapar University, Department of Electrical & Instrumentation Engineering, Patiala, India.

(Continued)

*Primary Examiner* — Syed Zaidi
(74) *Attorney, Agent, or Firm* — Cygan Law Offices P.C.; Joseph T. Cygan

(57) ABSTRACT

A multimodal biometric authentication system utilizes a bulk absorption characteristic of human tissue that is measurable using a photoplethysmography (PPG) sensor. One disclosed method of operation includes extracting bulk absorption features from biometric data obtained using a PPG sensor and generating a first biometric template. Additional biometric features are also extracted from biometric data obtained using a second biometric sensor and a second biometric template is also generated. An authentication output signal is provided in response to the first biometric template matching a first enrolled biometric template and the second biometric template matching a second enrolled biometric template.

20 Claims, 9 Drawing Sheets

(56) References Cited

U.S. PATENT DOCUMENTS

2016/0183812 A1* 6/2016 Zhang .................. A61B 5/7246
600/301

OTHER PUBLICATIONS

Kataria, Atul N., et al., A Survey of Automated Biometric Authentication Techniques, International Conference on Engineering (NUiCONE), 2013, pp. 1-6, Nirma University, Ahmedabad, Gujarat, India.

Deriche, M., Trends and Challenges in Mono and Multi Biometrics, IEEE Image Processing Theory, Tools & Applications, 2008, King Fand University of Petroleum & Minerals (KFUPM), Dhahran, Saudi Arabia.

Odinaka, I., et al., ECG Biometric Recognition: A Comparative Analysis, IEEE Transactions on Information Forensics and Security, Dec. 2012, pp. 1812-1824, vol. 7, No. 6.

Spachos, P., et al., Feasibility Study of Photoplethysmographic Signals for Biometric Identification, IEEE 2011, University of Toronto, The Edward S. Rogers Sr. Department of Electrical and Computer Engineering, Toronto, ON, Canada.

Sundararajan, M., Correlative analysis of human cardio-respiratory signals with PPG signal using spectral analysis techniques, May 31, 2010, Chapter 3, pp. 23-41, Bharath University, Department of Electronics and Communication Engineering, Tamil Nadu, India.

Al-Hamdani, O., et al., Multimodal Biometrics Based on Identification and Verification System, J Biomet Biostat 4: 163. doi:10.4172/2155-6180.1000163.

Reddy, P., et al., A New Method for Fingerprint Antispoofing using Pulse Oxiometry, IEEE, 2007, Indian Institute of Technology Delhi, New Delhi, India.

* cited by examiner

MULTIMODAL BIOMETRIC AUTHENTICATION SYSTEM AND METHOD WITH PHOTOPLETHYSMOGRAPHY (PPG) BULK ABSORPTION BIOMETRIC

FIELD OF THE DISCLOSURE

The present disclosure relates generally to biometric authentication systems and more particularly to biometric fusion (also referred to as "multimodal") authentication systems that use two or more biometrics or that use two or more algorithms applied to the same biometric data.

BACKGROUND

Biometric authentication systems offer a quick and convenient means of personal authentication without the need to remember and enter passwords. Various forms of biometric authentication have been developed and each form presents its own unique set of challenges. Generally speaking, biometric authentication systems are subject to spoofing or falsing.

For example, fingerprint biometric authentication systems can sometimes be subject to falsing by an unauthorized person's finger or may even be "fooled" by a synthetic false finger. This susceptibility to falsing is an issue with many types of biometric authentication or identification systems. Because of this susceptibility, the concept of "biometric fusion" or "multimodal biometric" systems is gaining in popularity. In such multimodal systems, it becomes more difficult to spoof or fake the biometric inputs because there is either more than one biometric required, or multiple algorithms are applied to the same biometric, and therefore the probability of spoofing to gain unauthorized access is significantly reduced.

DETAILED DESCRIPTION

Figure 1:
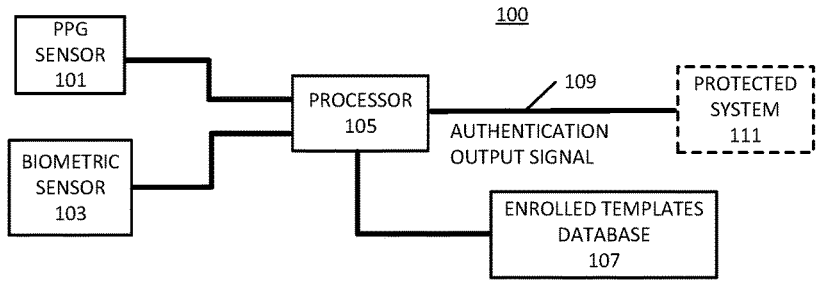
FIG. 1 is a block diagram of a photoplethysmography authentication system in accordance with an embodiment.

The present disclosure provides multimodal biometric authentication systems utilizing a bulk absorption characteristic of human tissue that is measurable using a photoplethysmography (PPG) sensor. The bulk absorption characteristic can be measured using reflective PPG techniques and sensors incorporated into wearable devices, mobile device or combinations thereof.

An aspect of the present disclosure is a method that includes extracting bulk absorption features from biometric data obtained using a PPG sensor and generating a first biometric template. Additional biometric features are also extracted from biometric data obtained using a second biometric sensor and a second biometric template is also generated. Accordingly, an authentication output signal is provided in response to the first biometric template matching a first stored corresponding enrolled biometric template and the second biometric template matching a second stored corresponding enrolled biometric template. In some embodiments, the second biometric sensor may be a second PPG sensor that operates in a different spectral range from the first PPG sensor. In such embodiments, a multimodal biometric authentication system may be implemented by requiring the bulk absorption characteristics, measured within different spectral ranges, to match in order to provide an authentication output signal. In yet other embodiments, the combined bulk absorption characteristics at two or more spectral ranges may be required, along with another different biometric.

In another aspect of the present disclosure, a method includes extracting bulk absorption features from biometric data obtained using a PPG sensor in a first device and generating a first biometric template in the first device; sending a first authentication output signal, from the first device to a second device over a wireless link, in response to the first biometric template matching a first stored corresponding enrolled biometric template stored in the first device; extracting biometric features from biometric data obtained using a second biometric sensor in a second device and generating a second biometric template in the second device; and providing a second authentication output signal in response to receiving the first authentication output signal from the first device, and the second biometric template matching a second stored corresponding enrolled biometric template stored in the second device.

Another aspect of the present disclosure is a multimodal biometric authentication apparatus that includes a PPG sensor; a second biometric sensor; non-volatile, non-transitory memory, containing at least two enrolled biometric templates, a first enrolled biometric template related to a bulk absorption biometric and a second enrolled biometric template related a biometric measurable by the second biometric sensor; and a processor, operatively coupled to the PPG sensor, to the second biometric sensor, and to the memory.

The processor is operative to extract bulk absorption features from biometric data obtained using the PPG sensor and generate a first biometric template; extract biometric features from biometric data obtained using the second biometric sensor and generate a second biometric template; and provide an authentication output signal in response to the first biometric template matching the first enrolled biometric template and the second biometric template matching the second enrolled biometric template. In some embodiments, the second biometric sensor may be a second PPG sensor having a spectral range different than the first PPG sensor.

Another aspect of the present disclosure is a wearable device that includes a PPG sensor; a second biometric sensor; a transceiver; and a controller, operatively coupled to the PPG sensor, to the second biometric sensor, and to the transceiver, The controller is operative to obtain biometric data collected using the PPG sensor and using the second biometric sensor; and send the biometric data obtained using the PPG sensor and using the second biometric sensor to a second device over a wireless link using the transceiver.

The wearable device may be included in a multimodal biometric authentication system along with a mobile device. The mobile device includes a transceiver; a controller, operatively coupled to the transceiver; non-volatile, non-transitory memory, containing at least two enrolled biometric templates, with a first enrolled biometric template related to a bulk absorption biometric and with a second enrolled biometric template related to a biometric measurable by the second biometric sensor in the wearable device; and data processing logic, operatively coupled to the controller, The data processing logic is operative to extract bulk absorption features from biometric data obtained using the PPG sensor in the wearable device and generate a first biometric template; extract biometric features from biometric data obtained using the second biometric sensor in the wearable device and generate a second biometric template; and provide an authentication output signal in response to the first biometric template matching the first enrolled biometric template and the second biometric template matching the second enrolled biometric template.

Another aspect of the present disclosure is a wearable device that includes a PPG sensor; a second biometric sensor; a transceiver; and data processing logic, operatively coupled to the PPG sensor and to the second biometric sensor. The data processing logic is operative to extract bulk absorption features from biometric data obtained using the PPG sensor and generate a first biometric template; and extract biometric features from biometric data obtained using the second biometric sensor and generate a second biometric template. A controller is operatively coupled to the data processing logic, and to the transceiver. The controller is operative to send the first biometric template and the second biometric template to a second device over a wireless link using the transceiver.

The wearable device may be included in a multimodal biometric authentication along with a mobile device. The mobile device includes a transceiver; non-volatile, non-transitory memory, containing at least two enrolled biometric templates: a first enrolled biometric template related to a bulk absorption biometric and a second enrolled biometric template related to a biometric measurable by the second biometric sensor in the wearable device. A controller is operatively coupled to the transceiver and to the memory. The controller is operative to provide an authentication output signal in response to the first biometric template matching the first enrolled biometric template and the second biometric template matching the second enrolled biometric template. The controller is further operative to send the authentication output signal to either the wearable device or to an external third device over a wireless link using the transceiver in the mobile device.

Another aspect of the present disclosure is a multimodal biometric authentication system that includes a first device and a second device. The first device and the second device each include a biometric sensor; a transceiver; non-volatile, non-transitory memory that contains at least one enrolled biometric template, with at least one of the first or the second devices having a first enrolled biometric template related to a bulk absorption biometric and the other of the first or second devices having a second enrolled biometric template; and data processing logic, operatively coupled to the biometric sensor.

The data processing logic is operative to extract bulk absorption features from biometric data obtained using the biometric sensor and generate a first biometric template. A controller is operatively coupled to the data processing logic, and to the transceiver. The controller is operative to provide an authentication output signal in response to the biometric template matching the at least one enrolled biometric template; and send the authentication output signal to the other device over a wireless link using the transceiver.

In embodiments of the multimodal biometric authentication system, the biometric sensor of the first device is a PPG sensor; and the biometric sensor of the second device may be either a microphone, a fingerprint sensor, a palm reader, or an iris scanner. In other embodiments, the biometric sensor of the first device is a PPG sensor having a first spectral range and the biometric sensor of the second device is a PPG sensor having a second spectral range.

Turning now to the drawings wherein like numerals represent like components, FIG. 1 is a block diagram of a multimodal biometric authentication system 100 that includes a photoplethysmography (PPG) bulk absorption biometric in accordance with an embodiment. The authentication system 100 includes a PPG sensor 101 and a second biometric sensor 103 which may be any of various types of biometric sensors. For example, the second biometric sensor 103 may be a fingerprint reader, a palm print reader, an iris scanner, one or more microphones operatively coupled to a voice recognition system, or a second PPG sensor in some embodiments. The PPG sensor 101 and the second biometric sensor 103 are operatively coupled to a processor 105. The various components and devices that are described herein as being "operatively coupled" refers to such operative coupling as that having, in some embodiments, one or more intermediate or intervening components that may exist between, or along the connection path between two such components such that the components are understood to be operatively coupled in that data or commands or control signals can be sent from one to the other and vice versa.

The processor 105 obtains raw sensor data from each biometric sensor and extracts the relevant biometric features. The processor 105 is operative to use the extracted biometric features to create corresponding biometric templates for comparison with enrolled biometric templates stored in an enrolled templates database 107. The database 107 contains one or more enrolled biometric templates related to one or more users of the multimodal biometric authentication system 100. An enrolled biometric template is a biometric template that a user has voluntarily provided to the authentication system, using a separate biometric template enrollment security procedure, to verify their identity and make an association between the enrolled biometric template and the user's identity. A biometric template represents a signature related to a biological characteristic of an individual, for example, a person's bulk absorption characteristic for their skin tissue. Such biological characteristics may be measured at various points on the human body for example, at a fingertip or on the wrist or ankle. Data processing logic may then generate a biometric template from obtained biometric sensor data and compare it with the enrolled biometric template and determine whether the templates match.

If a match is found between both of the generated templates with corresponding enrolled template stored in the enrolled templates database 107, then the processor 105 will produce an authentication output signal 109 which will enable access to the protected system 111. The multimodal authentication system 100 is referred to as "multimodal" in that both the PPG sensor 101 and the second biometric sensor 103 must produce a match with the enrolled templates database 107. The biometric features extracted from the PPG sensor 101 that are used to generate the biometric template is limited to the bulk absorption of the user which is related to a DC component of the PPG sensor 101 output. In other words, only one of three possible components of the PPG data is utilized.

A PPG signal may be considered to consist of three components; a component related to arterial blood volumetric changes (which can be related to heart activity); a component related to venous blood volume changes (which is a slow rate signal that modulates the overall PPG signal); and a DC component which may be related to the optical properties of the biological tissue. These optical properties include, for example absorptivity and reflectivity which may be mathematically modeled as transmission and reflection coefficients within the spectral frequency range of interest.

Figure 2:
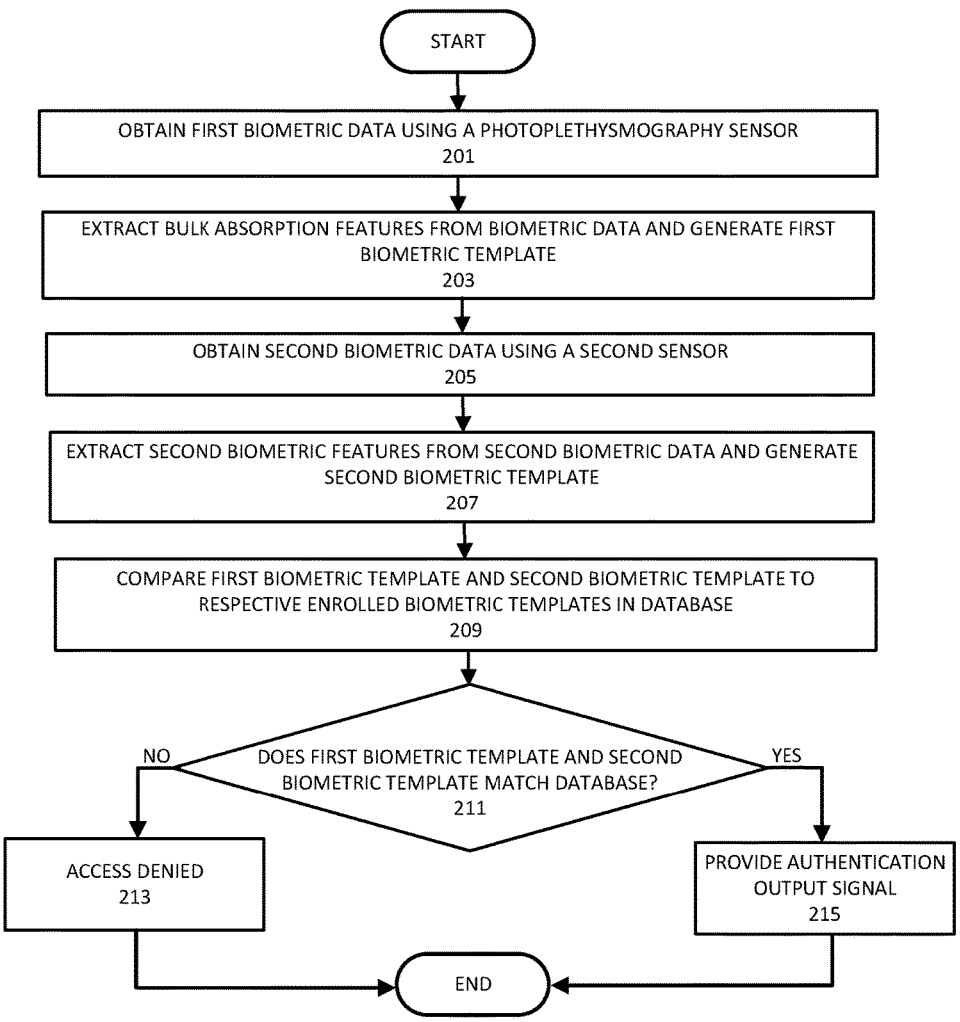
FIG. 2 is a flow chart showing a method of operation of the system shown in FIG. 1, in accordance with an embodiment.

A method of operation of the system shown in FIG. 1 is illustrated in the flowchart of FIG. 2. The method of operation begins, and in operation block 201 the processor 105 obtains first biometric data using PPG sensor 101. In operation block 203, the processor 105 extracts bulk absorption features from the first biometric data and generates a first biometric template. In operation block 205, the processor 105 obtains second biometric data from second biometric sensor 103. In operation block 207 the processor 105 extracts second biometric features from the second biometric data and generates a second biometric template. In operation block 209, the processor 105 compares the generated first biometric template and the generated second biometric template to respective enrolled biometric templates contained in the database 107. In decision block 211, the processor 105 checks whether both of the first biometric template and the second biometric template form a match with templates contained in the database 107. If a match is found, then in operation block 215 the processor 105 provides the authentication output signal 109 and the method of operation ends as shown. If a match with the database 107 is not found in decision block 211, then the processor 105 denies access to the protected system 111 as shown in operation block 213, and the method of operation terminates.

Figure 3:
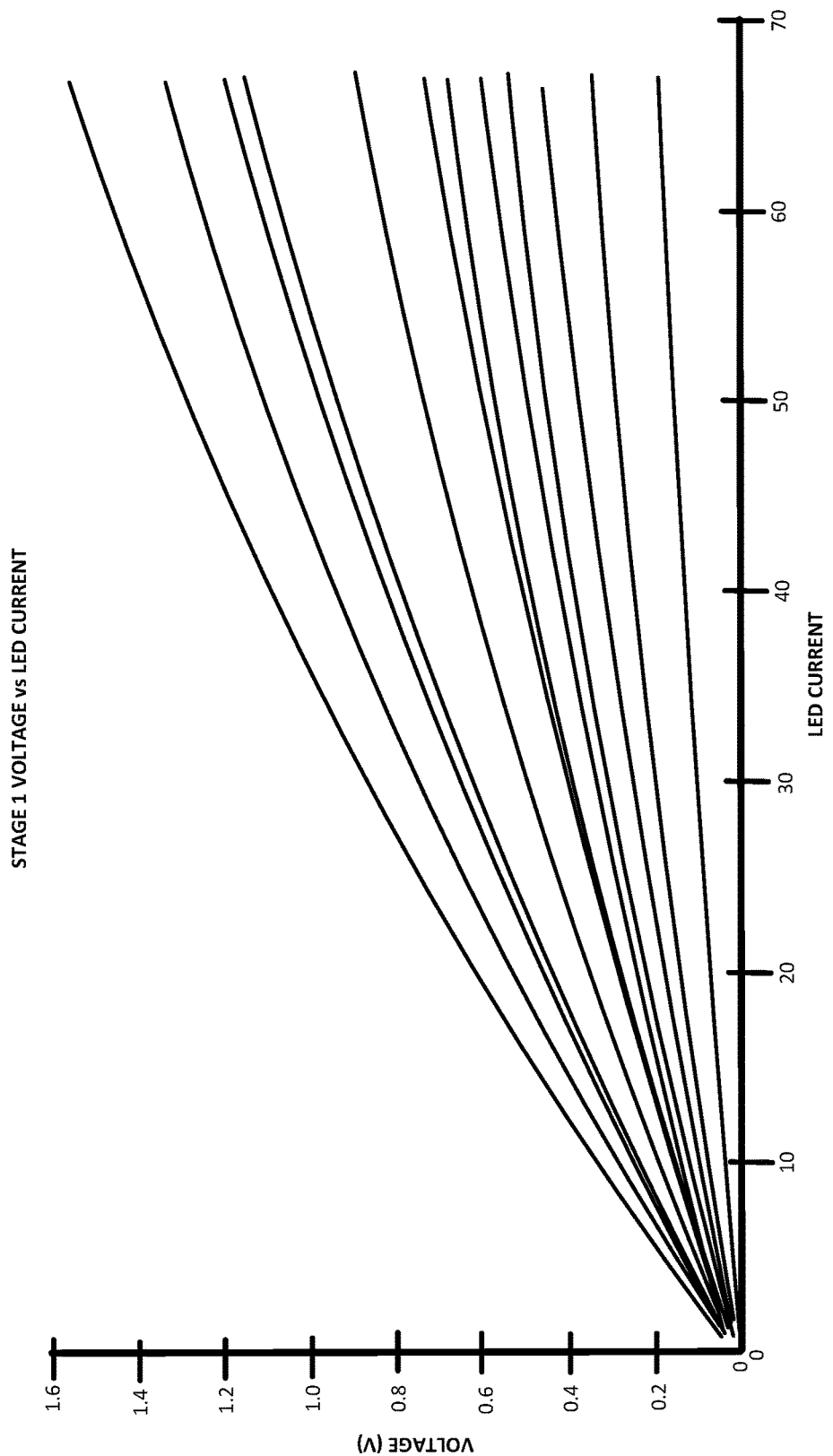
FIG. 3 is an example plot of photoplethysmography sensor voltage versus LED current which corresponds to bulk absorption for various users.

FIG. 3 is an example plot of photoplethysmography sensor voltage versus LED current which corresponds to bulk absorption for various users. The PPG sensor 101 will include at least one LED and a photodiode. In some embodiments, the PPG sensor 101 will include multiple LEDs and multiple photodiodes. The FIG. 3 example plot may be considered to correspond to a single LED and photodiode pair in a biometric PPG sensor used to obtain the measurement. Each one of the curves shown in the example plot is related to a specific user's bulk absorption characteristic. As can be seen from the example plot, individual users have bulk absorption characteristics that are different enough from each other such that a determination of which user is which can be ascertained. This PPG bulk absorption characteristic information is therefore useful in combination with other biometric data in a multimodal biometric authentication system as discussed briefly above with respect to FIG. 1 and FIG. 2.

Another type of multimodal biometric system that can be implemented using the PPG bulk absorption characteristic illustrated in the example plot of FIG. 3 is a system using PPG sensor measurements within different spectral ranges. For example, PPG measurements may be taken within a red spectral range and another set of PPG measurements may be taken within, for example, a green spectral range. A red spectral range (i.e. infrared) is often used for transmission PPG system measurements because red light achieves better penetration through human tissue. In contrast, a green spectral range is often used for reflective PPG measurements because green does not have the ability to penetrate through human tissue as well and therefore more of the green spectral light applied is reflected from layers of the tissue. Therefore by taking PPG measurements using two different spectral ranges a different PPG characteristic template can be created for each spectral range. Therefore, in one example embodiment related to FIG. 1, the second biometric sensor 103 may be a second PPG sensor having a spectral range different from that of PPG sensor 101. In other embodiments, only one PPG sensor may be used where the PPG sensor has the capability of using multiple spectral ranges.

Figure 4:
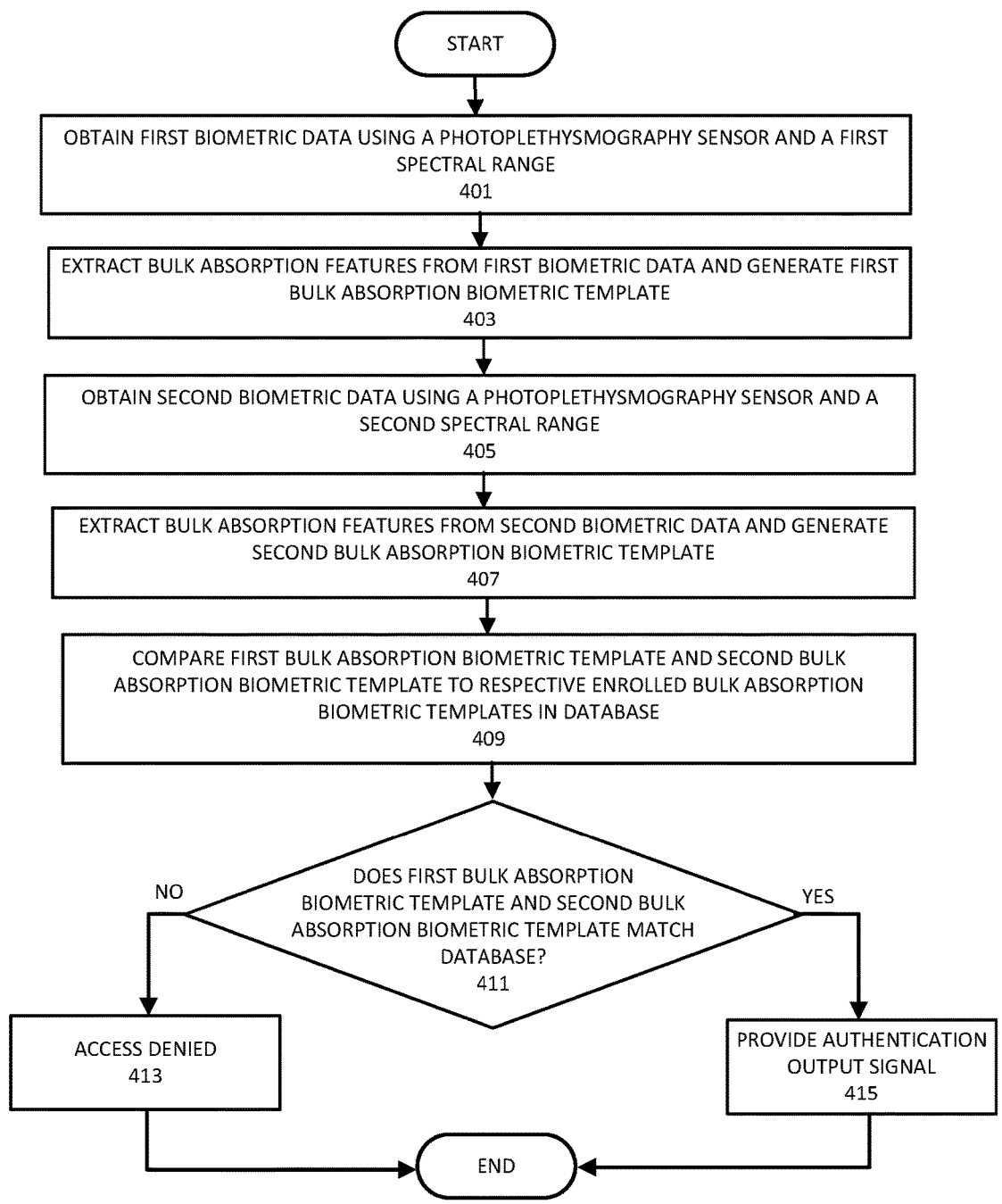
FIG. 4 is a flowchart showing a method of operation using either a multispectral photoplethysmography sensor or using a first sensor having a first spectral range and a second sensor having a second spectral range in accordance with an embodiment.

FIG. 4 is a flowchart showing a method of operation using either a single multispectral PPG sensor or using a first PPG sensor having a first spectral range and a second PPG sensor having a second spectral range in accordance with an embodiment. The method of operation will be described with respect to the multimodal biometric authentication system 100 shown in FIG. 1 with the second biometric sensor 103 assumed to be a second PPG sensor with a spectral range that differs from PPG sensor 101. The method of operation begins, and in operation block 401, the processor 105 obtains first biometric data using the PPG sensor 101 in a first spectral range. In operation block 403, the processor 105 extracts bulk absorption features from the first biometric data and generates a first bulk absorption biometric template. In operation block 405, the processor 105 obtains second biometric data using a second PPG sensor (i.e. biometric sensor 103 in this example) in a second spectral range. In operation block 407, the processor 105 extracts bulk absorption features from the second biometric data and generates a second bulk absorption biometric template. In operation block 409, the processor 105 compares the first bulk absorption biometric template and the second bulk absorption biometric template to respective enrolled bulk absorption biometric templates in the database 107.

In decision block 411, the processor 105 checks whether both of the first bulk absorption biometric template and the second bulk absorption biometric template match enrolled templates within the database 107. If a match is detected, then in operation block 415 the processor 105 provides the authentication output signal 109 to allow access to the protected system 111 and the method of operation terminates as shown. If a match is not detected between one or the other, or both, of the biometric templates and an enrolled template in the database 107, then access is denied as shown in operation block 413 and the method of operation also terminates. In other words, both PPG characteristics taken at the different spectral ranges must each match respective enrolled biometric templates in order for the authentication output signal 109 to be provided.

Some additional example embodiments that employ the bulk absorption biometric characteristic along with a second biometric will now be described. It is to be understood that in the various embodiments, the second biometric may be a second bulk absorption biometric characteristic measured within a spectral range different from the first bulk absorption biometric characteristic as described above with respect to FIG. 4. It is also to be understood that other biometrics other than bulk absorption biometric characteristics may be used such as, but not limited to, fingerprint detection, voice print detection, an iris scan, body odor detection, body heat signature detection or some other biometric.

Figure 5:
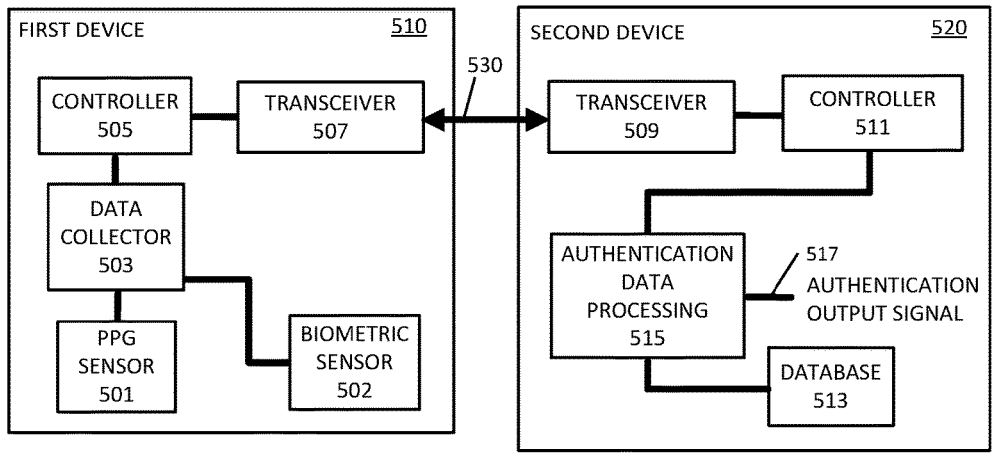
FIG. 5 is a block diagram of a multimodal biometric authentication system with a first device having two biometric sensors and a second device performing authentication data processing in accordance with an embodiment.

A first such example embodiment is illustrated in the block diagram of FIG. 5. An example multimodal biometric authentication system includes a first device 510 having a PPG sensor 501 and a second biometric sensor 502, and a second device 520 that includes authentication data processing logic 515. The first device 510 includes a transceiver 507 operatively coupled to the controller 505. The controller 505 is operatively coupled to a data collector 503 which is further operatively coupled to the PPG sensor 501 and to the second biometric sensor 502. The data collector 503 is operative to obtain raw sensor data from the PPG sensor 501 and from the second biometric sensor 502. The controller 505 is operative to communicate with the transceiver 507 to pass the raw sensor data to the second device 520 over a wireless link 530 between the transceiver 507 and the transceiver 509 within the second device 520.

The transceiver 509, in the second device 520, is operatively coupled to a controller 511. The controller 511 is further operatively coupled to authentication data processing logic 515. The controller 511 is operative to receive the raw sensor data from transceiver 509 sent to it from the first device 510. The controller 511 hands the raw sensor data to the authentication data processing logic 515 which proceeds to extract biometric features and perform template generation. The authentication data processing logic 515 is also operative to compare the generated templates to enrolled templates stored in the database 513. If a match is found, then the authentication data processing logic 515 also produces the authentication output signal 517. The authentication output signal 517 may be returned to the first device 510 over the wireless link 530, may be sent to a third device (not shown), or may enable access to a protected system included on the second device 520. For example, in some embodiments, the authentication output signal 517 unlocks the second device 520, the first device 510, or both devices.

In some embodiments, the first device 510 may be categorized as a "wearable device." As mobile devices decrease in size due to continuing advances in miniaturization technologies, some have become "wearable devices" in the sense that these devices may be worn by a user as a fashion accessory such as jewelry, an article of clothing, a portion of an article of clothing, etc. A wearable device may have any suitable structure and therefore the possible wearable devices may include a ring, a wristwatch (also referred to as a "smartwatch"), a button or brooch which may include a pin for attaching to clothing, or a patch that may be sewn to, or into, clothing such as a shirt or blouse, etc. Other example wearable devices may include a bracelet, an anklet, a belt buckle, etc.

The wireless transceiver 507 of the wearable device, and the wireless transceiver 509 of the second device, may utilize any suitable wireless technology such as IEEE 802.11 (also referred to as WiFi®), Bluetooth®, Wireless USB, ZigBee, Bluetooth® Low Energy (also referred to as "Bluetooth® Smart") or any other suitable wireless technology that may form the wireless link 530 between the first device 510 and the second device 520 to transfer information or command and control signaling there-between. The first device 510 and the second device may go through a pairing procedure or a connection procedure depending on the wireless technology employed. The second device 520, may be a mobile device such as, but not limited to, a mobile phone (also referred to as a "smartphone"), a laptop computer, electronic book reader, personal digital assistant (PDA), electronic game console, or similar device. In some embodiments, one of the devices may be at a fixed location and the other device may be a mobile device or wearable. Some examples of this are when the multimodal authentication system is used for door access, or other fixed system access such as access to a fixed control panel or fixed computer equipment. In these cases, the user may have a portable device (i.e. the wearable or mobile device) which communicates with a fixed device in the two-step authentication process.

Therefore the wireless transceivers of both devices can each receive wireless signals from, and send wireless signals to, the other device wireless transceiver over the wireless link 530. The data collector 503 is operatively coupled to the transceiver 507 such that it may send data over the wireless link 530 to the second device 520. The data collector 503 is also operative to receive command and control signals from the second device 520 by way of the transceiver 507 and the wireless link 530. For example, a controller 511 within the second device 520 may send a command signal to the data collector 503 to initiate data collection from the PPG sensor 501 or from the second biometric sensor 502.

The authentication process may be initiated in the various embodiments using a variety of approaches. In one approach, the PPG sensor 501 may send out a reflective signal periodically to determine whether a user is present (i.e. whether human tissue is nearby and being detected). Because the first device 510, the second device 520, or both may be powered by batteries within the devices in some embodiments, this approach is performed periodically in order to conserve battery power for the respective device. For a fixed device where power may be provided from a power source other than a battery, power conservation may not be an issue and therefore the PPG sensor 501 or second biometric sensor 502 may be in a constant "on" state (or "sensing state") such that data collection will begin as soon as the controller 505 determines that human tissue is present or that the relevant inputs are present for biometric sensor 502. In other embodiments, a third sensor may be used in one or both devices such as a proximity sensor that detects the presence of a user. In that case, the proximity sensor output may be used as a trigger input to the controller 505 to initiate the data collector 503 to collect biometric sensor data from the PPG sensor 501 and the second biometric sensor 502. Another approach is a user initiated authentication where the user invokes a user interface on one of the devices to manually initiate the authentication process. Any other approach to initiation of the authentication process may be used in the various embodiments.

Figure 6:
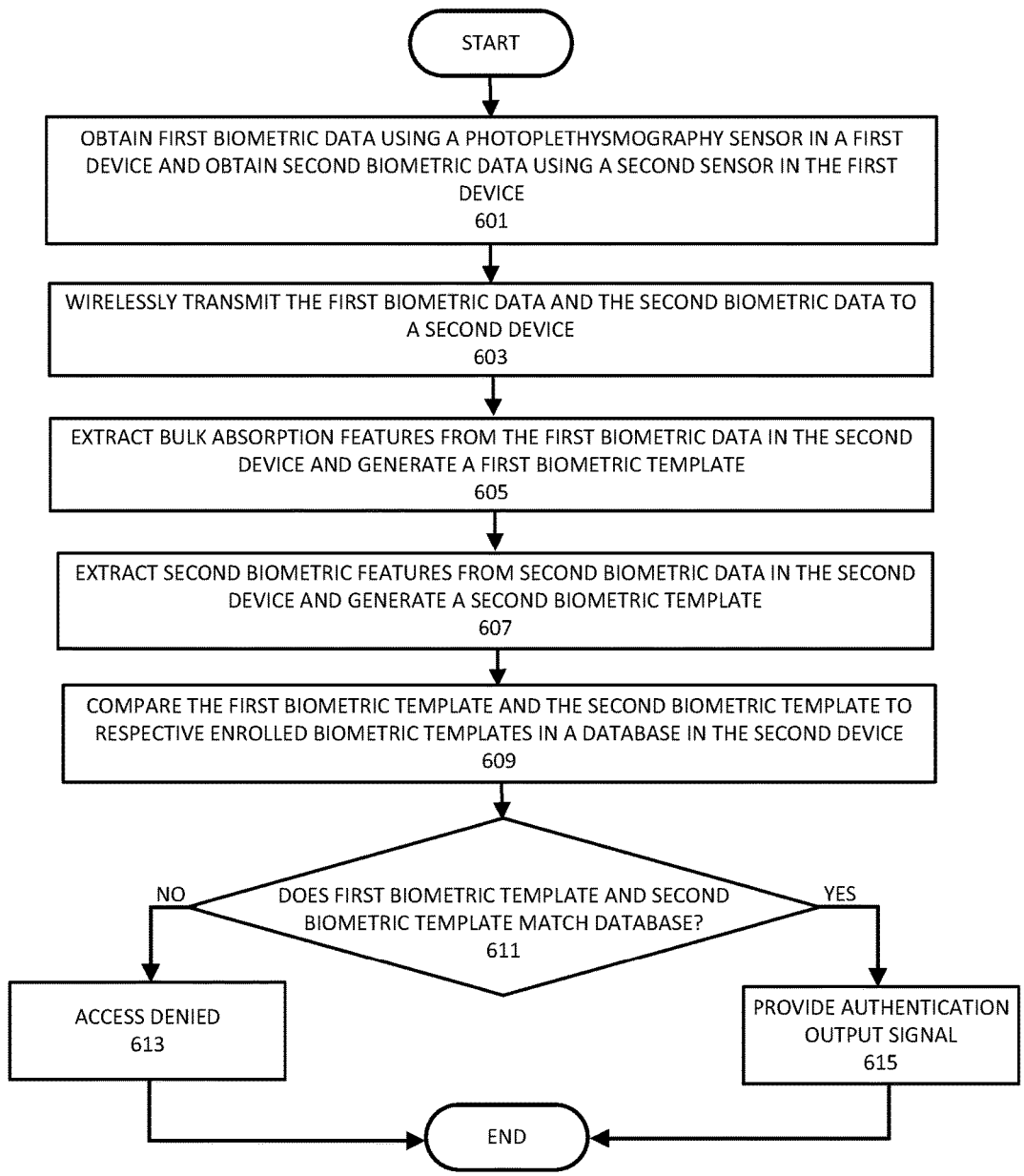
FIG. 6 is a flow chart showing a method of operation of the system shown in FIG. 5, in accordance with an embodiment.

The flowchart of FIG. 6 provides a method of operation of the multimodal authentication system shown in FIG. 5, in accordance with an embodiment. The method of operation begins and in operation block 601, the data collector 503 obtains first biometric data using PPG sensor 501, and obtains second biometric data using the second biometric sensor 502. In operation block 603, the controller 505 uses the transceiver 507 to wirelessly transmit the first biometric data and the second biometric data to the second device 520 over the wireless link 530. The controller 511 receives the biometric data and passes it to the authentication data processing logic 515. In operation block 605, the authentication data processing logic 515 extracts the bulk absorption features from the first biometric data and generates a first biometric template. In operation block 607, the authentication data processing logic 515 extracts the second biometric features from the second biometric data and generates a second biometric template. In operation block 609, the authentication data processing logic 515 compares the first biometric template and the second biometric template to respective corresponding enrolled biometric templates contained in the database 513. In decision block 611, the authentication data processing logic 515 determines whether the first biometric template and the second biometric template both match the database. If yes, then in operation block 615, the authentication data processing logic 515 provides the authentication output signal 517 and the method of operation terminates. If a match with the database is not found in decision block 611, then in operation block 613 access is denied and the method of operation also terminates.

Figure 7:
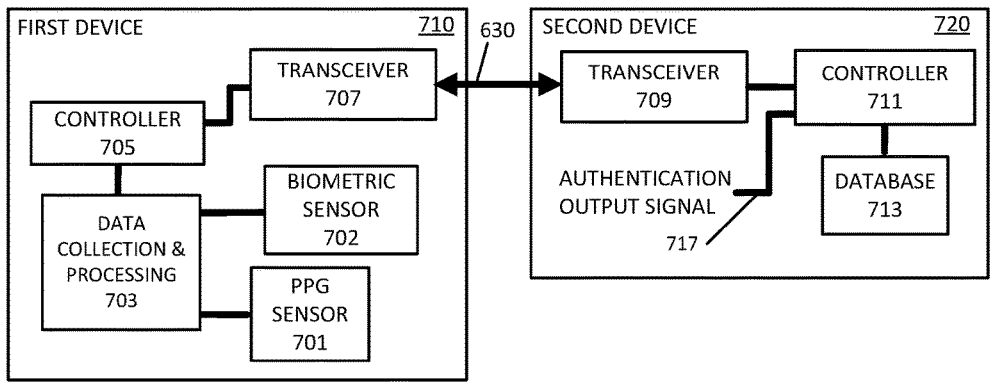
FIG. 7 is a block diagram of a multimodal biometric authentication system with a first device having two biometric sensors and a performing authentication data processing by accessing a database in a second device in accordance with an embodiment.

Another embodiment of a multimodal biometric authentication system is illustrated in FIG. 7. A first device 710 includes a PPG sensor 701 and a second biometric sensor 702 which are similar to the sensors in the FIG. 5 system. The biometric sensors are operatively coupled to data collection and processing logic 703. The data collection and processing logic 703 may be considered as an integration of the data collector 503 features and the authentication data processing logic 515 features into a single logic component.

The data collection and processing logic 703 is further operatively coupled to controller 705 which is further operatively coupled to transceiver 707. The second device 720 includes a transceiver 709 operative to communicate with the first transceiver 707 by wireless link 630. The transceiver 709 is operatively coupled to controller 711 and the controller 711 is operatively coupled to database 713. The controller 711 is operative to provide the authentication output signal 717. The transceivers and controllers in FIG. 7 are also similar to the transceivers and controllers in the FIG. 5 system.

Figure 8:
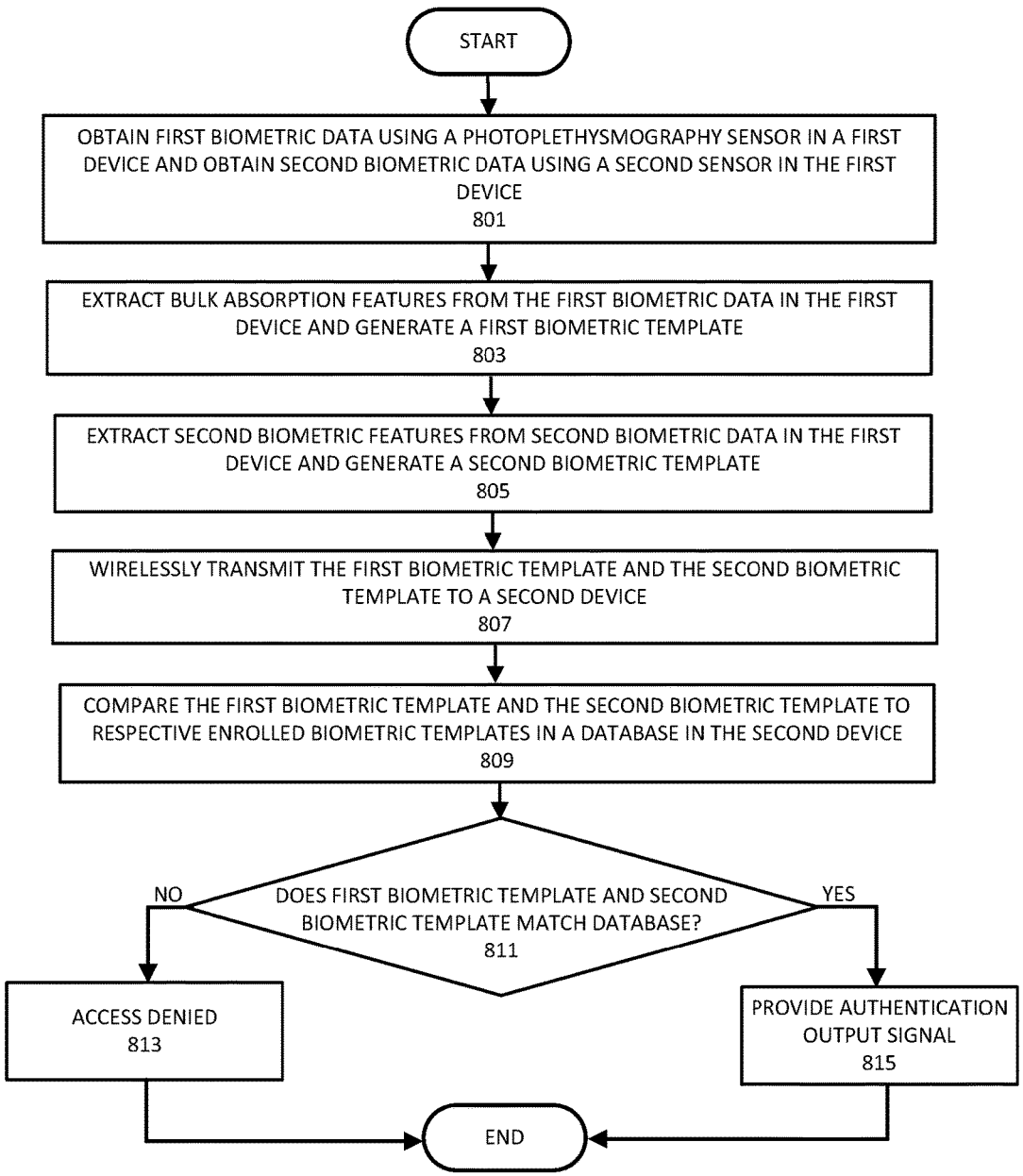
FIG. 8 is a flow chart showing a method of operation of the system shown in FIG. 7, in accordance with an embodiment.

The flow chart of FIG. 8 provides a method of operation of the multimodal authentication system shown in FIG. 7, in accordance with an embodiment. The method of operation begins and in operation block 801, the data collection and processing logic 703 obtains first biometric data using the PPG sensor 701 and obtains second biometric data using the second biometric sensor 702. In operation block 803, the data collection and processing logic 703 extracts bulk absorption features from the first biometric data and generates a first biometric template. In operation block 805 the data collection and processing logic 703 extracts second biometric features from the second biometric data and generates a second biometric template. In operation block 807, the controller 705 communicates with the transceiver 707 and wirelessly transmits the first biometric template and the second biometric template to the second device 720 using the wireless link 630. In operation block 809, the second device controller 711 compares the first biometric template and the second biometric template to respective corresponding enrolled biometric templates in the database 713. In decision block 811, if the controller 711 finds that the first biometric template and the second biometric template match the database 713, then in operation block 815, the controller 711 provides the authentication output signal 717 and the method of operation terminates. If a match is not found in decision block 811, then the controller 711 denies access as shown in operation block 813 and the method of operation also terminates.

Figure 9:
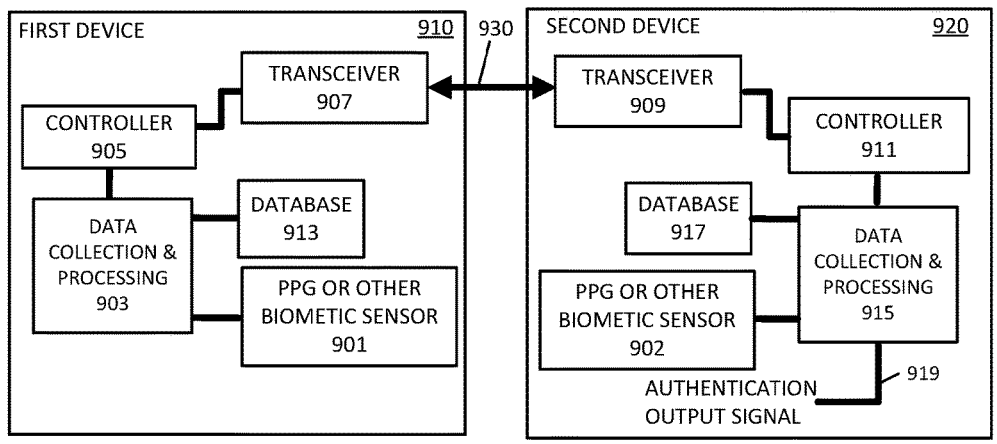
FIG. 9 is a block diagram of a multimodal biometric authentication system with a first device having a first biometric sensor, authentication data processing, and a first database. A second device has a second biometric sensor, authentication data processing and a second database. The first device and the second device exchange authentication information in accordance with an embodiment.

Another embodiment of a multimodal biometric authentication system is illustrated in the block diagram of FIG. 9. The multimodal biometric authentication system includes a first device 910 and a second device 920. The first device 910 includes a transceiver 907 operatively coupled to a controller 905 which is further operatively coupled to data collection and processing logic 903. The data collection and processing logic 903 is operatively coupled to a biometric sensor 901 and to a database 913. The biometric sensor 901 may be a PPG sensor or some other biometric sensor. The second device 920 includes a transceiver 909 that is operative to communicate with transceiver 907 using the wireless link 930. The transceiver 909 is operatively coupled to a controller 911 which is further operatively coupled to data collection and processing logic 915. The data collection and processing logic 915 is operatively coupled to the biometric sensor 902 and to the database 917. The biometric sensor 902 may also be one or the other of a PPG sensor or some other biometric sensor. The transceivers, controllers and data collection and processing logic components are similar to those discussed with respect to the FIG. 5 and FIG. 7 systems. In the FIG. 9 system, the first device 910 and the second device 920 each independently evaluate a respective biometric corresponding to the type of biometric sensor incorporated into the device. At least one of the two devices incorporates a PPG sensor as its biometric sensor. The other device may have either some other type of biometric sensor, or a second PPG sensor that operates in a different spectral range from that of its partner device.

Figure 10:
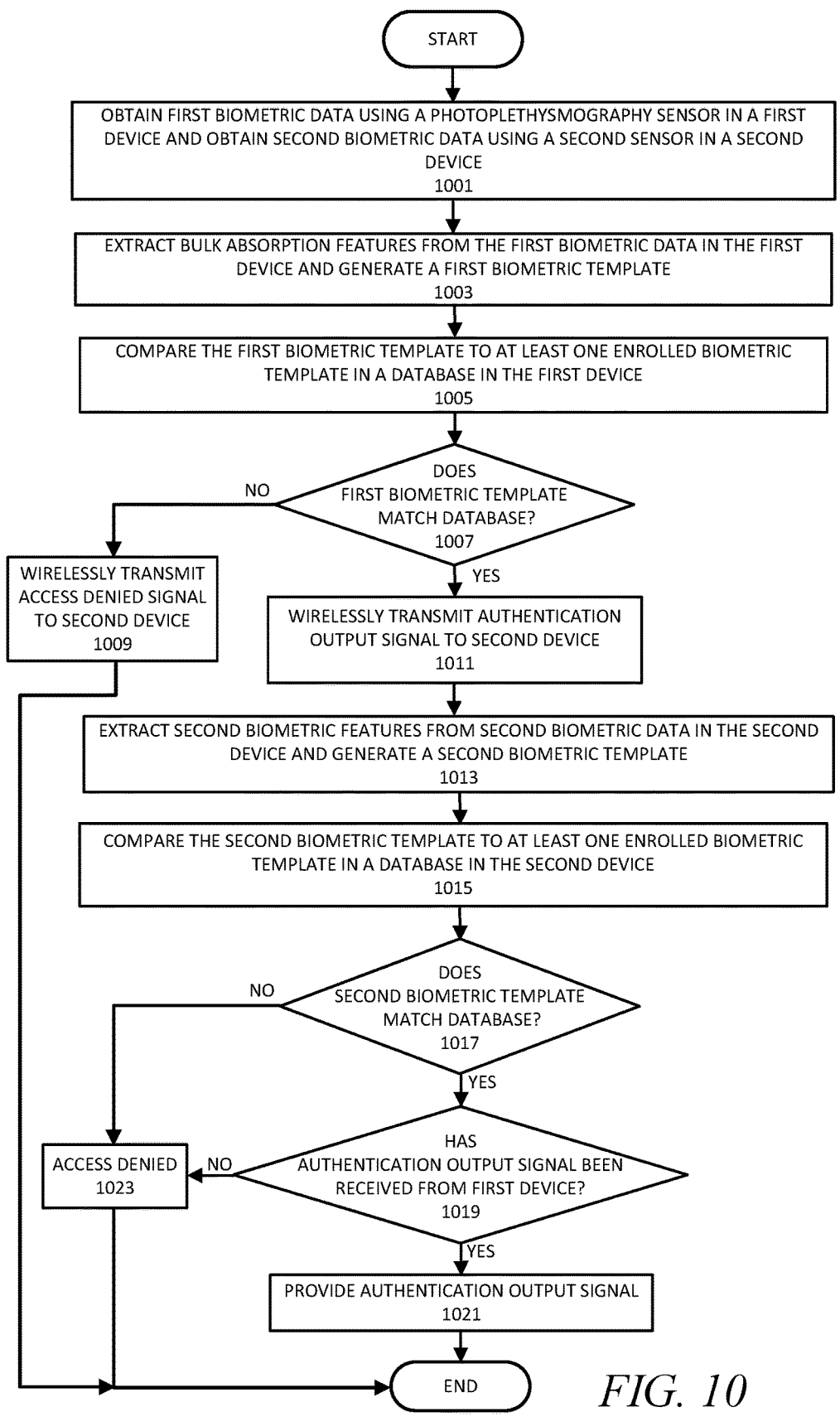
FIG. 10 is a flow chart showing a method of operation of the system shown in FIG. 9, in accordance with an embodiment.

Operation of the multimodal biometric authentication system shown in FIG. 9 is best understood with respect to the flowchart of FIG. 10. The method of operation begins and in operation block 1001, the data collection and processing logic 903 obtains first biometric data using biometric sensor 901 which may be a PPG sensor. The second device data collection and processing logic 915 likewise obtains second biometric data from biometric sensor 902 which may be another type of biometric sensor or may be a second PPG sensor with a different spectral range. In operation block 1003, in an embodiment in which the biometric sensor 901 is a PPG sensor, the data collection and processing logic 903 extracts bulk absorption features from the first biometric data and generates a first biometric template. In operation block 1005, the data collection and processing logic 903 compares the first biometric template to at least one enrolled biometric template in the database 913. In decision block 1007, the data collection and processing logic 903 checks whether the biometric template matches an enrolled template in the database 913. If a match with the database 913 found in decision block 1007, then in operation block 1011 the controller 905 communicates with the transceiver 907 and wirelessly transmits a first authentication output signal to the second device 920 using the wireless link 930.

However if a match with the database 913 is not found in decision block 1017, then in operation block 1009, the first device 910 wirelessly transmits an access denied signal to the second device using the wireless link 930, and the method of operation terminates. If in operation block 1011, the authentication output signal is transmitted to the second device 920 then the method of operation proceeds to operation block 1013. In operation block 1013, the second device data collection and processing logic 915 extracts second biometric features from the second biometric data and generates a second biometric template. As shown in operation block 1015, the data collection and processing logic 915 then compares the second biometric data to at least one enrolled biometric template in the database 917. In decision block 1017, the data collection and processing logic 915 checks whether the second biometric template matches an enrolled template contained in the database 917. If a match is found in decision block 1017, then in decision block 1019 the data collection and processing logic 915 checks whether or not an authentication output signal has been received from the first device 910. If the authentication output signal was received in operation block 1011 and verified in decision block 1019, then the data collection processing logic 915 provides an authentication output signal 919 as shown in operation block 1021 and the method of operation terminates.

If the second biometric template does not match an enrolled template contained in the database 917, then the data collection and processing logic 915 issues the access denied signal as shown in operation block 1023 and the method of operation terminates. Likewise, if an authentication output signal was not received from first device in decision block 1019 the access denied command is also issued in operation block 1023 which terminates the method of operation. In other words, the multimodal authentication system requires that the biometrics taken by both the first device 910 and the second device 920 match enrolled biometric templates in their respective databases.

Figure 11:
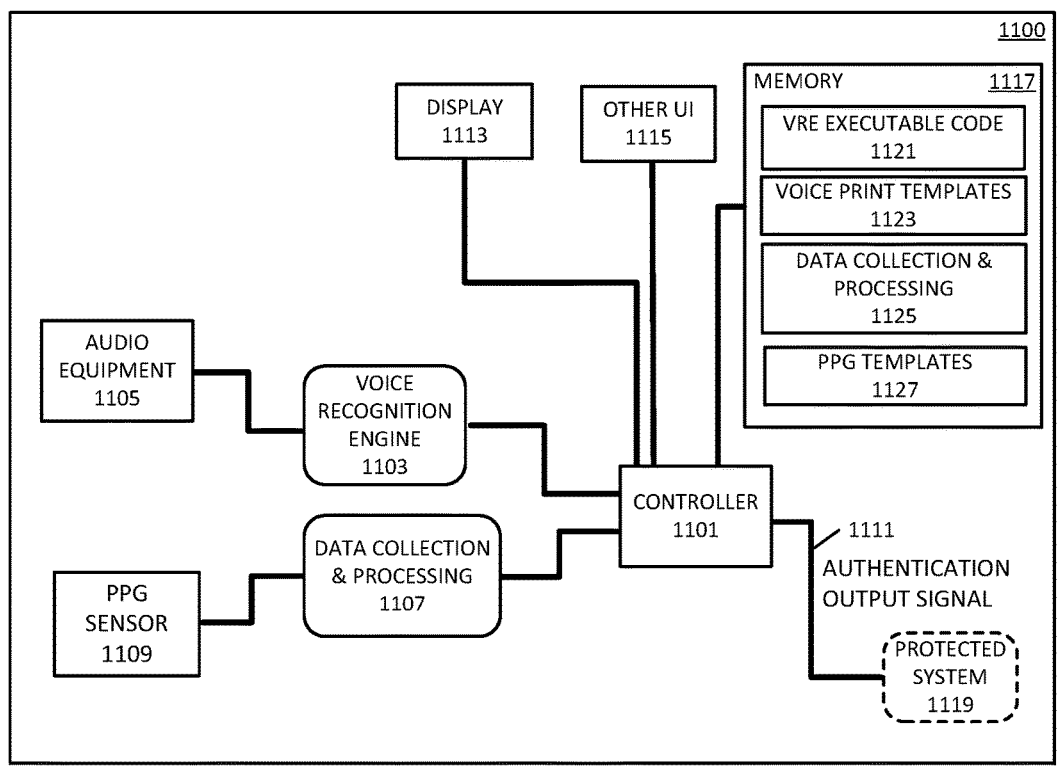
FIG. 11 is a block diagram of a multimodal biometric authentication system in a device having a photoplethysmography biometric sensor, at least one microphone operatively coupled to a voice recognition engine and authentication data processing in accordance with an embodiment.

Another embodiment of a multimodal biometric authentication system is illustrated in FIG. 11. A device 1100 includes a PPG sensor 1109, audio equipment 1105 that includes at least one microphone and that is operatively coupled to a voice recognition engine 1103, and data collection and processing logic 1107. The data collection and processing logic 1107 and the voice recognition engine 1103 are both operatively coupled to a controller 1101. The controller 1101 is operative to issue an authentication output signal 1111 to a protected system 1119 which in response, grants a user access. The audio equipment 1105 may include, among other things, at least one microphone, at least one speaker, signal amplification, analog-to-digital conversion/digital audio sampling, echo cancellation, and other audio processing, etc., which may be applied to one or more microphones and/or one or more speakers of the device 1100.

The protected system 1119 may be a system present on the device 1100 or may be an external system that is physically external from the device 1100 in some embodiments. The device 1100 also includes a display 1113 which is operatively coupled to the controller 1101, and other user interfaces 1115 which are also operatively coupled to the controller 1101. The other user interfaces 115 may include, but are not limited to, a keypad, touch sensors, a gyroscope and accelerometer (which may be separate or integrated in a single package), mouse, buttons, etc. The controller 1101 is operatively coupled to a non-volatile non-transitory memory 1117.

The memory 1117 includes executable code 1121 for the voice recognition engine (VRE) 1103, data collection and processing executable code 1125 for the data collection and processing logic 1107, various voice print templates 1123 (also referred to as "voice models") and PPG templates 1127 which are biometric templates. The voice print templates 1123 and the PPG templates 1127 are enrolled biometric template databases that contain biometric templates of at least one user that have been enrolled through a biometric enrollment process and such enrollment processes are well understood.

The voice print templates 1123 are used by the controller 1101 to compare a voice print obtained from the voice recognition engine 1103 and determine if a match exists. Likewise, the PPG templates 1127 contained in memory 1117 are also used by the controller 1101 to compare with PPG templates generated by the data collection and processing logic 1107 to determine whether a match exists. If the controller 1101 detects a matching voice print from the voice recognition engine 1103 and matching a PPG template from the data collection and processing logic 1107, then the controller 1101 issues the authentication output signal 1111 to the protected system 1119 and thereby grants access.

Figure 12:
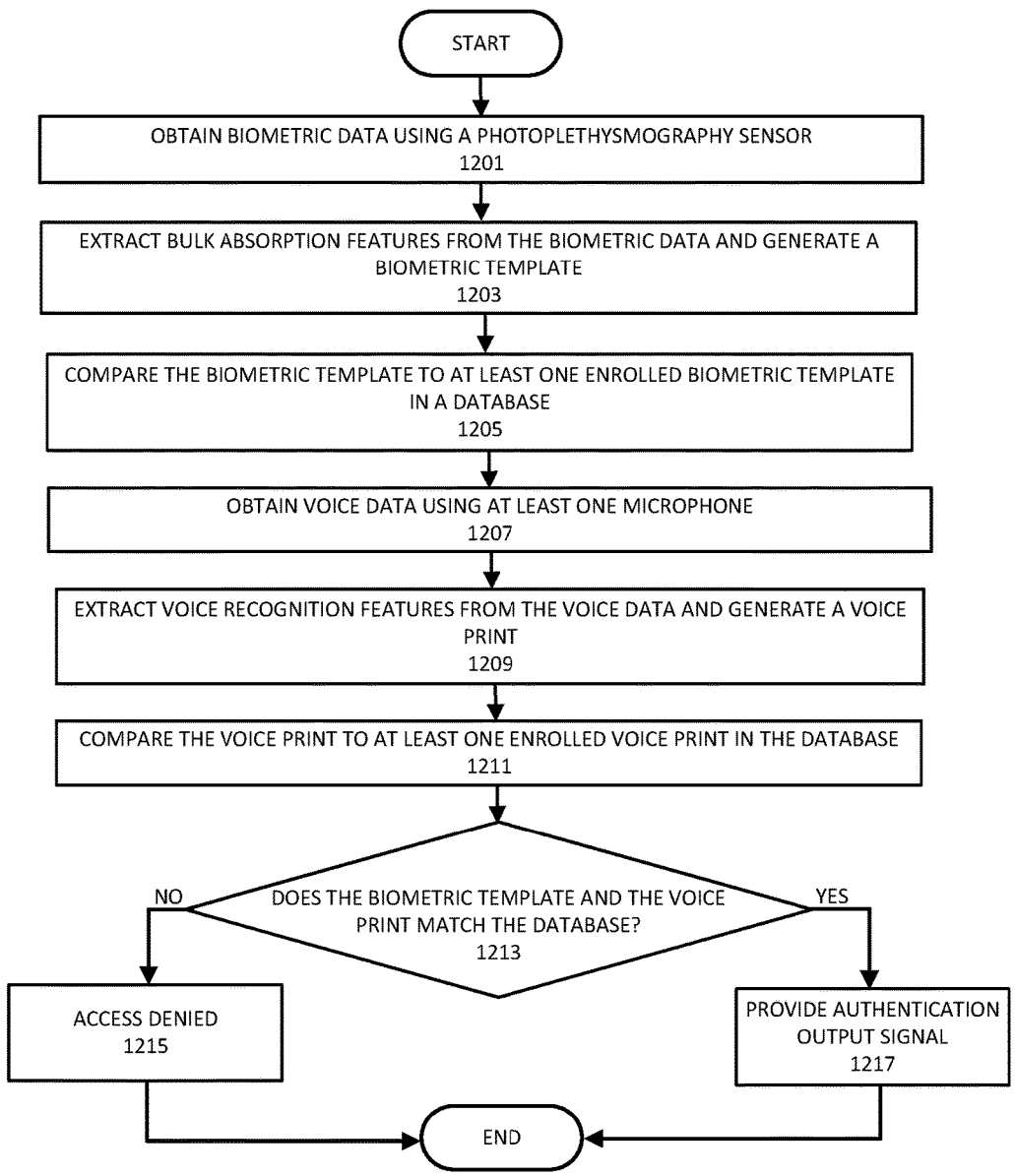
FIG. 12 is a flow chart showing a method of operation of the system shown in FIG. 11, in accordance with an embodiment.

Operation of the device 1100 is best understood from the flowchart shown in FIG. 12. The method of operation begins and in operation block 1201, the data collection and processing logic 1107 obtains PPG biometric data using the PPG sensor 1109. In operation block 1203, the data collection and processing logic 1107 extracts bulk absorption features from the PPG biometric data and generates a biometric template. In operation block 1205, the controller 1101 compares the biometric template to at least one enrolled biometric template in the PPG templates 1127 database. In operation block 1207, voice recognition engine 1103 obtains voice data using at least one microphone of the audio equipment 1105. In operation block 1209, the voice recognition engine 1103 extracts voice recognition features from the voice data and generates a voice print. In operation block 1211, the controller 1101 compares the voice print to at least one enrolled voice print in the voice print templates 1123. In decision block 1213, the controller 1101 checks whether the biometric template and the voice print match their respective databases. If both matches are found in decision block 1213, then in operation block 1217 the controller 1101 provides the authentication output signal 1111 and the method of operation terminates with an access grant. If one or both of either the voice print or the biometric template (i.e. bulk absorption features) do not match their respective databases in decision block 1213, then the controller 1101 denies access as shown in operation block 1215 and the method of operation also terminates.

It is to be understood that the block diagrams provided herein show at least those components necessary to describe the features and advantages of the various embodiments to those of ordinary skill, but that various other components, circuitry, logic, etc. may be present in order to implement various functions and features of the devices such as the example wearable and other mobile devices and that those various other components, circuitry, devices, etc., are understood to be present in the various embodiments by those of ordinary skill.

It is to be understood that information and commands such as, but not limited to, raw biometric sensor data, biometric templates and/or an authentication output signal, sent over the wireless links described herein may be encrypted using any of various suitable data encryption techniques for sending data and/or for communication over wireless links in order to enhance security and prevent middle-man snooping (also referred to as "sniffing") attacks that attempt to intercept and obtain data over the wireless link.

The various components shown and described in the figures corresponding to multimodal authentication systems may be implemented independently as software and/or firmware executing on one or more programmable processors, and may also include, or may be implemented independently, using ASICs, DSPs, hardwired circuitry (logic circuitry), or combinations thereof. That is, any of the various described controllers, the data collector 503, authentication data processing logic 515, data collection and processing logic 703, data collection and processing logic 903, data collection and processing logic 915, voice recognition engine 1103, and/or data collection and processing logic 1107 components, may be implemented using an ASIC, DSP, executable code executing on a processor, logic circuitry, or combinations thereof.

Each of the various described database components are implemented in the various embodiments via non-volatile, non-transitory computer readable memory. The memory 1117, which is also non-volatile, non-transitory computer readable memory, contains executable instructions or executable code, such as VRE executable code 1121 and data collection and processing executable code 1125, for execution by at least one processor, that when executed, cause the at least one processor to operate in accordance with the functionality and methods of operation herein described. The computer readable memory may be any suitable non-volatile, non-transitory, memory such as, but not limited to, programmable chips such as EEPROMS, flash ROM (thumb drives), compact discs (CDs) digital video disks (DVDs), etc., that may be used to load executable instructions or program code to other processing devices such as mobile devices, including wearable devices, or other devices such as those that may benefit from the features of the herein described embodiments.

Various applications exist for the multimodal biometric systems disclosed herein and these various applications are contemplated by the present disclosure. One such application is to add a PPG sensor having a green spectral range for obtaining a reflective PPG measurement to a medical device having an infrared PPG sensor. The green spectral range PPG measurement may be used to identify or authenticate the patient and to correlate their infrared PPG measurements to their patient records. The patient would have been previously enrolled in the PPG biometric database for the hospital. Another application is a device unlocking feature that requires a PPG biometric on, for example, a smartwatch having a PPG sensor incorporated in the wristband or the case housing, and a second biometric such as a voice print from a second device such as a smartphone. The smartwatch may send an authentication output signal wirelessly to the smartphone to unlock the smartphone if the user's PPG bulk absorption characteristic taken at the smartwatch match and a voice print taken by the smartphone also matches. Other ways of combining two or more biometric features to enhance security and authentication reliability will occur to those of ordinary skill in light of the present disclosure.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A method comprising:
    extracting bulk absorption features from biometric data obtained using a first photoplethysmography (PPG) sensor and generating a first biometric template;
    extracting bulk absorption features from biometric data obtained using a second PPG sensor that operates in a different spectral range from the first PPG sensor;
    generating a second biometric template using the extracted bulk absorption features from the biometric data obtained at the different spectral range; and
    providing an authentication output signal in response to the first biometric template matching a first enrolled biometric template and the second biometric template matching a second enrolled biometric template.

2. The method of claim 1, further comprising:
    extracting additional bulk absorption features from additional biometric data obtained using the first PPG sensor in a second spectral range and generating a third biometric template; and
    providing the authentication output signal in response to the first biometric template matching a first enrolled biometric template, the second biometric template matching a second enrolled biometric template, and the third biometric template matching a third enrolled biometric template.

3. The method of claim 1, further comprising:
    sending the authentication output signal to a protected system over a wireless link.

4. The method of claim 1, further comprising:
    extracting bulk absorption features from biometric data obtained using the first PPG sensor in an infrared spectral range and generating a first biometric template;
    extracting bulk absorption features from biometric data obtained using the second PPG sensor in a green spectral range; and
    generating the second biometric template using the extracted bulk absorption features from the biometric data obtained at the green spectral range.

5. A multimodal biometric authentication apparatus, comprising:
    a first photoplethysmography (PPG) sensor operative in a first spectral range;
    a second PPG sensor operative in a second spectral range; and
    a processor, operatively coupled to the first PPG sensor and to the second PPG sensor, the processor operative to:
        extract bulk absorption features from biometric data obtained using the first PPG sensor in the first spectral range and generate a first biometric template;
        extract biometric features from biometric data obtained using the second PPG sensor in the second spectral range and generate a second biometric template; and
        provide an authentication output signal in response to the first biometric template matching a first enrolled biometric template and the second biometric template matching a second enrolled biometric template.

6. The multimodal biometric authentication apparatus of claim 5, wherein the second PPG sensor is a multispectral PPG sensor; and
    wherein the processor is further operative to:
        extract additional bulk absorption features from additional biometric data obtained using the second PPG sensor in a third spectral range and generate a third biometric template; and provide the authentication output signal in response to the first biometric template matching a first enrolled biometric template, the second biometric template matching a second enrolled biometric template, and the third biometric template matching a third enrolled biometric template.

7. The multimodal biometric authentication apparatus of claim 5, wherein one of the PPG sensors is a reflective PPG sensor.

8. The multimodal biometric authentication apparatus of claim 5, where the first PPG sensor is an absorptive PPG sensor and the second PPG sensor is a reflective PPG sensor.

9. The multimodal biometric authentication apparatus of claim 5, further comprising:
   non-volatile, non-transitory memory, operatively coupled to the processor, the memory containing at least two enrolled biometric templates, the first enrolled biometric template related to a bulk absorption biometric measurable by the first PPG sensor, and
   the second enrolled biometric template related to a bulk absorption biometric measurable by the second PPG sensor.

10. The multimodal biometric authentication apparatus of claim 5, wherein the first PPG sensor is operative in an infrared spectral range and the second PPG sensor is operative in a green spectral range.

11. The multimodal biometric authentication apparatus of claim 10, wherein the first PPG sensor is an absorptive PPG sensor and the second PPG sensor is a reflective PPG sensor.

12. The multimodal biometric authentication apparatus of claim 5, further comprising a wireless transceiver, operatively coupled to the processor, the wireless transceiver operative to send the authentication output signal to a protected system over a wireless link.

13. A method comprising:
   extracting bulk absorption features from biometric data obtained using a photoplethysmography (PPG) sensor in a first spectral range and generating a first biometric template;
   extracting biometric features from biometric data obtained using a second biometric sensor and generating a second biometric template;
   extracting additional bulk absorption features from additional biometric data obtained using the PPG sensor in a second spectral range and generating a third biometric template; and
   providing an authentication output signal in response to the first biometric template matching a first enrolled biometric template, the second biometric template matching a second enrolled biometric template, and the third biometric template matching a third enrolled biometric template.

14. The method of claim 13, wherein extracting biometric features from biometric data obtained using the second biometric sensor and generating the second biometric template, comprises:
   extracting a voice print as the biometric features from biometric data obtained using a microphone as the second biometric sensor and generating a voice print as the second biometric template.

15. The method of claim 13, further comprising:
   sending the authentication output signal to a protected system over a wireless link.

16. A multimodal biometric authentication apparatus, comprising:
   a multispectral photoplethysmography (PPG) sensor;
   a second biometric sensor;
   a processor, operatively coupled to the PPG sensor and to the second biometric sensor, the processor operative to:
      extract bulk absorption features from biometric data obtained using the PPG sensor and generate a first biometric template;
      extract biometric features from biometric data obtained using the second biometric sensor and generate a second biometric template;
      extract additional bulk absorption features from additional biometric data obtained using the multispectral PPG sensor in a second spectral range and generate a third biometric template; and
      provide the authentication output signal in response to the first biometric template matching a first enrolled biometric template, the second biometric template matching a second enrolled biometric template, and the third biometric template matching a third enrolled biometric template.

17. The multimodal biometric authentication apparatus of claim 16, wherein the second biometric sensor is a microphone.

18. The multimodal biometric authentication apparatus of claim 17, wherein the processor is further operative to:
   extract a voice print as the biometric features from biometric data obtained using the microphone as the second biometric sensor and generate a voice print as the second biometric template.

19. The multimodal biometric authentication apparatus of claim 16, wherein the multispectral PPG sensor is operative in an infrared spectral range and in a green spectral range.

20. The multimodal biometric authentication apparatus of claim 16, further comprising a wireless transceiver, operatively coupled to the processor, the wireless transceiver operative to send the authentication output signal to a protected system over a wireless link.

* * * * *